Feb. 12, 1957  T. PETRIDES  2,781,489
PHASE DETECTORS
Filed April 6, 1953
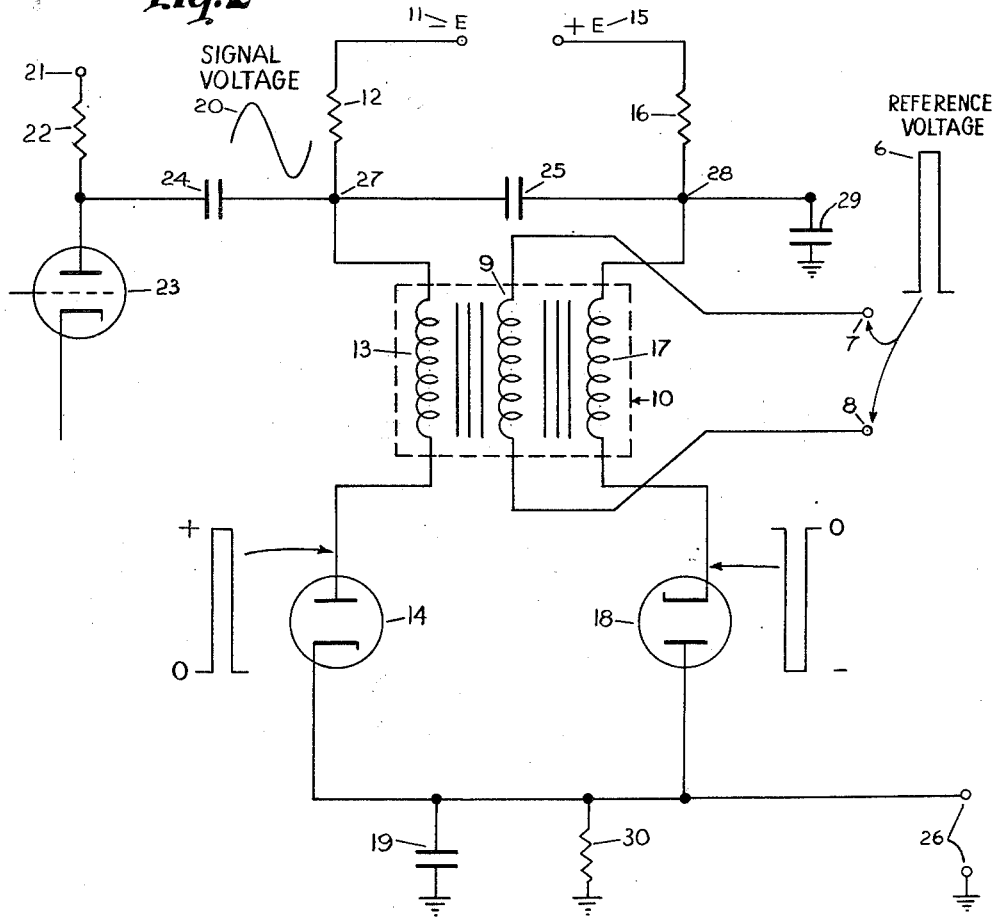
INVENTOR
*THRACY PETRIDES*
BY
*Ernest Fanwick*
ATTORNEY

United States Patent Office 2,781,489
Patented Feb. 12, 1957

2,781,489

PHASE DETECTORS

Thracy Petrides, New York, N. Y., assignor to International Telephone and Telegraph Corporation, a corporation of Maryland Application April 6, 1953, Serial No. 346,832

7 Claims. (Cl. 324—87)

This invention relates to a phase detector and more particularly to means for detecting the phase angle between a recurrent set of pulses of predetermined frequency and a signal voltage having the same fundamental frequency.

In many applications it is necessary to determine the exact time of occurrence of the zero value of a sinusoid with respect to an arbitrary reference, in order to measure the variation in phase between an input signal and the arbitrary reference point. In the past this phase measurement was usually accomplished by comparing the input signal sinusoid with a reference sine voltage and measuring the discrepancy between the zero values of the two sine waves. Such a method required extremely complicated means whose accuracy was of a comparatively low order.

It is an object of this invention to provide a phase detector circuit which will measure the phase difference between a reference pulse and a sinusoid signal voltage and indicate the phase angle as an error voltage either positive or negative depending upon the sign of the phase angle.

It is a further object of this invention to provide a phase detector which will measure the exact time of occurrence of the zero value of a sinusoid with respect to an arbitrary reference pulse.

One of the features of this invention is the use of a pulse transformer having three windings. The first winding is coupled to a reference voltage, the second winding is coupled between a negative bias voltage source and a first rectifier, the third winding is coupled between a positive bias voltage source and a second rectifier. The input signal is coupled in parallel across the two rectifiers, differently poled, and the output voltage is taken across a condenser connected in series with the rectifiers, the output voltage being the equivalent of an error voltage either positive or negative depending upon the sign of the phase angle.

The above-mentioned and other features and objects of this invention will become more apparent by reference to the following description taken in conjunction with the accompanying drawings, in which:

Fig. 1 is a graphic illustration of three signal voltages having various phase differences and a reference pulse; and Fig. 2 is a schematic circuit diagram of the phase detector of this invention.

Referring to Fig. 1, it is seen that if a sinusoidal signal voltage 1 has its zero value occur in coincidence with the occurrence of both a negative 2 and a positive 3 reference pulse, the sine wave will divide the reference pulses into two equal and opposite voltages, whereas if a sine wave 4 which is lagging out of phase with sine wave 1 is applied and the position of the reference pulses 2 and 3 are maintained stationary, it is seen that sine wave 4 will cross the reference pulses somewhere in the negative area, and a resultant negative voltage may be obtained which will be indicative of the lagging phase of sine wave 4. If a sine wave 5 is coupled into the circuit and is leading out of phase relative to sine wave 1 it is seen to cut the reference pulses 2 and 3 at a positive potential, and thus a resultant positive voltage can be taken to indicate a leading phase difference. Of course, it is obvious that the amount of lag or lead will be indicated as a magnitude of the output positive or negative voltage, thus essentially what is needed is a detector which will measure the phase difference between reference pulses 2, 3 and the input sine wave which may be termed the signal voltage.

Referring to Fig. 2, a schematic circuit diagram of a phase detector in accordance with the principles of this invention is shown wherein a reference voltage pulse 6 is coupled to the reference voltage input terminals 7 and 8 which comprise the input terminals for one winding 9 of a pulse type transformer 10. A source 11 of negative biasing voltage of magnitude "—E" is coupled through resistor 12 to one side of winding 13 of transformer 10. The other side of winding 13 is connected to the plate of rectifier tube 14. A source 15 of positive biasing voltage of magnitude "+E" is connected through resistor 16 to one terminal of winding 17 of transformer 10, the other side of winding 17 being connected to the cathode of rectifier 18. It is obvious that the negative and positive potentials from bias voltage sources 11 and 15 are connected in series with diode rectifiers 14 and 18 respectively. A condenser 19 is connected between the cathode of diode 14 and the plate of diode 18 to ground.

In the absence of an input signal voltage the negative voltage coupled to the plate of diode 14 is opposite in polarity and of equal amplitude to the reference voltage 6 which is induced from winding 9 to winding 13 and also applied to the plate of diode 14. The positive bias voltage coupled to the cathode of diode 18 is of equal amplitude and opposite in polarity to the reference voltage 6 which is induced from winding 9 to winding 17 and coupled to the cathode of diode 18. Since the biasing and reference voltages applied to the diodes 14 and 18 are of opposite polarity and of equal amplitude neither diode will conduct and the net charge across condenser 19 is zero.

If an input sinusoidal signal voltage 20 is coupled to terminal 21 through a resistor 22 to the plate of a driver tube 23 and the output of the plate circuit of tube 23 is coupled through a condenser 24 and a condenser 25 is coupled between windings 13 and 17 of transformer 10 the input signal voltage will be applied to the pulse transformer 10 along with the biasing and reference voltages. When the input signal voltage 20 applied to the terminal 21 has its zero amplitude coincide in time with the reference pulse 6 it is obvious that no additional voltage will be applied to the diodes 14 and 18 and thus neither will conduct causing the charge across condenser 19 to remain zero. As the output error voltage is taken from terminals 26 which are across condenser 19 the error voltage will be zero when the zero of the signal voltage 20 coincides in time with the reference voltage 6.

If a signal voltage is applied to terminal 21 in the absence of a reference pulse 6 each of the diodes 14 and 18 will conduct a voltage equal to the magnitude of the biasing voltages. However, the net charge across condenser 19 will remain zero because the voltages conducted by diodes 14 and 18 will be of equal magnitude and opposite polarity, thus cancelling out. If the zero of the signal voltage 20 applied to terminal 21 differs in time from the application of reference pulse 6 to terminals 7 and 8 as shown by curve 5, Fig. 1, the net voltages applied to diodes 14 and 18 will be positive since the reference voltage and biasing voltages will cancel, but the positive portion of the input signal voltage will appear at both diodes 14 and 18. Because a net positive voltage is applied to both diodes, diode 18 will conduct more than diode 14 causing a net positive charge to be applied to condenser 19. This net positive charge will appear across terminals 26 and may be utilized as an error voltage. If a signal voltage differs in time from the application of reference pulse 6 to terminals 7 and 8 as shown by curve 4, Fig. 1, the net voltages applied to diodes 14 and 18 will be negative since the reference voltage and biasing voltages will cancel and diode 14 will conduct more than diode 18 causing a net negative charge to be applied to condenser 19. This net negative charge will appear across terminals 26 and may be utilized as an error voltage to indicate a lagging phase.

For continuous operation of this circuit as a phase detector it is essential that the frequency of the input signal voltage be substantially identical with the frequency of the input reference voltage. However, the biasing potentials from source 11 should be of a magnitude sufficient to prevent destruction by the diodes in 14 and 18 due to the signal voltage 20 and therefore the signal voltage 20 should never exceed the bias potential from source 11. The amplitude of the reference pulse is not critical, and satisfactory operation can be obtained when the reference voltage 6 has a magnitude anywhere from slightly greater than zero to twice the bias potential level. Condensers 24 and 25 should have a low reactance to the signal voltage frequency so that points 27 and 28 have approximately the same voltage. Condenser 29 should be small having a capacitance only large enough to complete the return loop for the reference pulse 6 and therefore offering a high reactance to the input signal voltage 20. Resistances 12 and 22 should be of sufficient size to prevent a shunting effect on the bias potential source, and the time constant formed by condenser 19 and resistor 30 should be sufficiently long enough to allow no more than a 30% drop in voltage across condenser 19 from the peak value between cycles of the input signal voltage 20.

While I have described above the principles of my invention in connection with specific apparatus, it is to be clearly understood that this description is made only by way of example and not as a limitation to the scope of my invention as set forth in the objects thereof and in the accompanying claims.

I claim:

1. A phase detector comprising a source of input signal voltage, first and second rectifiers coupled in opposite poled relation in parallel to said source of signal voltage, a source of reference pulse voltage, a source of negative biasing voltage, means to apply said negative biasing voltage to said first rectifier, means responsive to a pulse from said reference pulse source to apply to said first rectifier a positive reference voltage, a source of positive biasing voltage, means to apply said positive biasing voltage to said second rectifier, means responsive to said pulse from said reference pulse source to apply to said second rectifier a negative reference voltage, capacitive means connected to the output of said rectifier, and output coupling means connected across said capacitive means.

2. A phase detector in accordance with claim 1 wherein said input signal voltage is of a predetermined fundamental frequency and said reference pulse voltage is of substantially the same predetermined frequency.

3. A phase detector according to claim 1 wherein said biasing voltages are of a magnitude at least equal to the peak of said input signal voltage.

4. A phase detector comprising a source of input signal voltage, a source of reference pulse voltage, a source of negative bias voltage, a source of positive bias voltage, first and second rectifying means coupled in opposite poled relation in parallel to said source of input signal voltage, a transformer having a first, second, and third winding, means coupling said first winding between said source of negative bias voltage and said first rectifier, means coupling said second winding to said source of reference pulse voltage, means coupling said third winding between said source of positive bias voltage and said second rectifier, a condenser, means to couple the output of said rectifiers to said condenser, and output coupling means coupled across said condenser.

5. A phase detector comprising a source of input signal voltage having a predetermined frequency, a source of reference pulse voltage of said predetermined frequency, a source of negative bias voltage having a magnitude at least equal to the peak voltage of said input signal voltage, a source of positive bias voltage having a magnitude at least equal to the peak of said input signal voltage, first and second diode rectifying tubes each having a cathode and an anode, means to couple the anode of said first diode and the cathode of said second diode to said source of input signal voltage, a transformer having a first, second, and third winding, said first winding being coupled between said source of negative bias voltage and the anode of said first diode, said second winding having coupled thereacross said source of reference pulse voltage, said third winding being coupled between said source of positive bias voltage and the cathode of said second diode, common connecting means coupling the cathode of said first diode to the anode of said second diode, a condenser, a resistor, means coupling said condenser and said resistor in parallel to said common connecting means, and output coupling means coupled across said condenser.

6. A phase detector comprising a source of input signal voltage having a predetermined frequency, a source of reference pulse voltage of said predetermined frequency, a source of negative bias voltage having a magnitude at least equal to the peak voltage of said input signal voltage, a source of positive bias voltage having a magnitude at least equal to the peak of said input signal voltage, first and second rectifiers each having a cathode and an anode, means to couple the anode of said first rectifier and the cathode of said second rectifier to said source of input signal voltage, a transformer having a first, second, and third winding, said first winding being coupled between said source of negative bias voltage and the anode of said first rectifier, said second winding having coupled thereacross said source of reference pulse voltage, said third winding being coupled between said source of positive bias voltage and the cathode of said second rectifier, and output means coupled to the cathode of said first rectifier and to the anode of said second rectifier.

7. A phase detector comprising a source of input signal voltage having a predetermined frequency, a source of reference pulse voltage of said predetermined frequency, a source of negative bias voltage having a magnitude equal to the peak voltage of said input signal voltage, a source of positive bias voltage having a magnitude at least equal to the peak of said input signal voltage, first and second rectifiers each having a cathode and an anode, a transformer having first, second, and third windings, means to couple the anode of said first rectifier and the cathode of said second rectifier to said first and third windings, respectively, means coupling the other end of said first winding to said source of negative bias voltage and to said source of signal voltage, means coupling the other end of said third winding to said source of positive bias voltage and to said source of signal voltage, means coupling said source of reference pulse voltage across said second winding, the inductive loop for said reference pulse voltage includes said first and third windings and capacitive means coupled thereto, common connecting means coupling the cathode of said first rectifier to the anode of said second rectifier and output coupling means including a capacitor coupled to said common connecting means.

(References on following page)

References Cited in the file of this patent

UNITED STATES PATENTS

| | | |
|---|---|---|
| 2,455,265 | Norgaard | Nov. 30, 1948 |
| 2,460,112 | Wright et al. | Jan. 25, 1949 |
| 2,463,685 | Fredendall et al. | Mar. 8, 1949 |
| 2,489,948 | Bell | Nov. 29, 1949 |

OTHER REFERENCES

Garner: Circuits for Horizontal A. F. C.; Television News, Radio-Electronics Sections, for July 1949, pp. 24–26.